(12) United States Patent
Liu et al.

(10) Patent No.: US 8,945,501 B2
(45) Date of Patent: Feb. 3, 2015

(54) METHOD FOR PREPARING CARBON NANOTUBE OR CARBON MICROTUBE

(71) Applicants: Jianhong Liu, Shenzhen (CN); Jian Xu, Shenzhen (CN); Shuangquan Wu, Shenzhen (CN)

(72) Inventors: Jianhong Liu, Shenzhen (CN); Jian Xu, Shenzhen (CN); Shuangquan Wu, Shenzhen (CN)

(*) Notice: Subject to any disclaimer, the term of this patent is extended or adjusted under 35 U.S.C. 154(b) by 0 days.

(21) Appl. No.: 14/040,768

(22) Filed: Sep. 30, 2013

(65) Prior Publication Data

US 2014/0027678 A1    Jan. 30, 2014

Related U.S. Application Data

(63) Continuation-in-part of application No. PCT/CN2012/073615, filed on Apr. 6, 2012.

(30) Foreign Application Priority Data

Apr. 7, 2011    (CN) .......................... 2011 1 0086492

(51) Int. Cl.
*D01F 9/14* (2006.01)
*D01F 9/22* (2006.01)
*C01B 31/02* (2006.01)
*H01B 1/04* (2006.01)

(52) U.S. Cl.
CPC ............. *C01B 31/0226* (2013.01); *C01B 31/02* (2013.01); *H01B 1/04* (2013.01); *C01B 31/0293* (2013.01); *D01F 9/22* (2013.01)

USPC .................. 423/447.1; 423/447.6; 423/447.7; 252/502; 252/503; 252/506; 252/507

(58) Field of Classification Search
CPC   C01B 31/02; C01B 31/0226; C01B 31/0293; H01B 1/04; D01F 9/22
USPC .................... 423/447.1–447.9; 977/734–741, 977/842–848; 252/502, 503, 506, 507
See application file for complete search history.

(56) References Cited

U.S. PATENT DOCUMENTS

2005/0025974 A1* 2/2005 Lennhoff ...................... 428/408

* cited by examiner

*Primary Examiner* — Daniel C McCracken
(74) *Attorney, Agent, or Firm* — Matthias Scholl P.C.; Matthias Scholl

(57) ABSTRACT

A method for preparing a carbon nanotube, including: a) preparing an LPAN solution, stirring the LPAN solution at between 100 and 200° C. for between 100 and 200 hours to yield a cyclized LPAN solution; b) heating the cyclized LPAN solution at between 200 and 300° C. for between 1 and 10 hours to yield an OPAN; c) grinding, screening, and drying at room temperature the OPAN to yield a thermal oxidative precursor; d) calcining the thermal oxidative precursor at between 400 and 1000° C. for between 1 and 24 h in the presence of inert gas having a flow rate of between 10 and 500 mL/min to yield a carbonated precursor; and e) calcining the carbonated precursor at between 1000 and 1500° C. for between 1 and 10 hours in the presence of the inert gas having a flow rate of between 10 and 500 mL/min to yield a carbon nanotube material.

15 Claims, 14 Drawing Sheets

METHOD FOR PREPARING CARBON NANOTUBE OR CARBON MICROTUBE

CROSS-REFERENCE TO RELATED APPLICATIONS

This application is a continuation-in-part of International Patent Application No. PCT/CN2012/073615 with an international filing date of Apr. 6, 2012, designating the United States, now pending, and further claims priority benefits to Chinese Patent Application No. 201110086492.7 filed Apr. 7, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of carbon tube materials, and more particular to a method for preparing a hollow bamboo-shaped carbon nanotube or microtube.

2. Description of the Related Art

As a one-dimensional nanomaterial, carbon nanotubes have light weight and a plurality of unusual mechanical, electrical, and chemical properties, and thus are widely used in various fields. For example, the carbon nanotubes are employed for manufacturing lightweight portable hydrogen containers, or as nano-scale wires for manufacturing complex circuits, or as catalyst attachments for expanding the surface area to improve the catalytic activity. Furthermore, the carbon nanotubes can be used for manufacturing composite materials having excellent performances such as high strength, high modulus, high temperature resistance, low thermal expansion coefficient, and strong heat denaturation resistance.

The carbon nanotubes are bamboo-shaped, conical, dendritic, or Y-shaped in shape. The bamboo-shaped carbon nanotubes include a series of separate hollow spaces, and thus have specific electronic properties and can be used as good electrode materials.

Typical preparation methods for the carbon nanotubes include an arc discharge method, laser ablation method, chemical vapor deposition method (hydrocarbon gas pyrolysis), solid phase pyrolysis, glow discharge method, combustion gas method, and polymerization synthesis, all of which have a complex process, high costs, and low yield.

SUMMARY OF THE INVENTION

In view of the above-described problems, it is one objective of the invention to provide a method for preparing a carbon nanotube or a carbon microtube for purposes of solving problems including complicated preparing process, high production costs, and low yield in the prior art.

To achieve the above objective, in accordance with one embodiment of the invention, there is provided a method for preparing a carbon nanotube, the method comprising:
a) preparing a liquid polyacrylonitrile (LPAN) solution, stirring the LPAN solution at between 100 and 200° C. for between 100 and 200 h to yield a cyclized LPAN solution;
b) heating the cyclized LPAN solution at between 200 and 300° C. for between 1 and 10 h to yield a thermally-oxidized polyacrylonitrile (OPAN) comprising a ladder structure;
c) grinding, screening, and drying at room temperature the OPAN to yield a thermal oxidative precursor;
d) calcining the thermal oxidative precursor at between 400 and 1000° C. for between 1 and 24 h in the presence of inert gas having a flow rate of between 10 and 500 mL/min to yield a carbonated precursor; and
e) calcining the carbonated precursor at between 1000 and 1500° C. for between 1 and 10 h in the presence of the inert gas having a flow rate of between 10 and 500 mL/min to yield a carbon nanotube material.

In a class of this embodiment, the method further comprises adding a doping agent to the cyclized LPAN solution and mixing for modifying the cyclized LPAN solution.

In a class of this embodiment, the LPAN has a relative molecular weight of between 106 and 100,000. The LPAN is a homopolymer of acrylonitrile, or a copolymer of acrylonitrile and a vinyl monomer; the vinyl monomer being styrene, methyl methacrylate, hydroxyethyl methacrylate, acrylic acid, or itaconic acid.

In a class of this embodiment, the LPAN has a relative molecular weight of between 1,600 and 25,000.

In a class of this embodiment, a mass ratio of the added doping agent to the cyclized LPAN solution is 0.01-0.5:1, and the mixing is achieved by stirring, ultrasonic sound, or ball grinding.

In a class of this embodiment, the doping agent is a metal doping agent or a nonmetal doping agent. The metal is tin, copper, argentum, aluminum, chrome, iron, titanium, manganese, nickel, or cobalt, or an oxide, nitride, boride, fluoride, bromide, sulfide, and organic compound thereof, or a mixture thereof. The nonmetal is silicon, phosphorus, boron, nitrogen, carbon, or sulfur, or a compound thereof, or a mixture thereof.

In a class of this embodiment, the inert gas in step d) and e) is nitrogen or argon.

In accordance with another embodiment of the invention, there is provided a method for preparing a carbon microtube, the method comprising:
a) preparing a liquid polyacrylonitrile (LPAN) solution, stirring the LPAN solution at between 100 and 200° C. for between 100 and 200 h to yield a cyclized LPAN solution;
b) heating the cyclized LPAN solution at between 200 and 300° C. for between 1 and 10 h to yield a thermally-oxidized polyacrylonitrile (OPAN) comprising a ladder structure;
c) grinding, screening, and drying at room temperature the OPAN to yield a thermal oxidative precursor;
d) calcining the thermal oxidative precursor at between 400 and 1000° C. for between 1 and 24 h in the presence of inert gas having a flow rate of between 10 and 500 mL/min to yield a carbonated precursor; and
e) calcining the carbonated precursor at between 1500 and 1800° C. for between 10 and 24 h in the presence of the inert gas having a flow rate of between 10 and 500 mL/min to yield a carbon microtube material.

In a class of this embodiment, the method further comprises adding a doping agent to the cyclized LPAN solution and mixing for modifying the cyclized LPAN solution.

In a class of this embodiment, the LPAN has a relative molecular weight of between 106 and 100,000. The LPAN is a homopolymer of acrylonitrile, or a copolymer of acrylonitrile and a vinyl monomer, the vinyl monomer being styrene, methyl methacrylate, hydroxyethyl methacrylate, acrylic acid, or itaconic acid.

In a class of this embodiment, the LPAN has a relative molecular weight of between 1,600 and 25,000.

In a class of this embodiment, a mass ratio of the added doping agent to the cyclized LPAN solution is 0.01-0.5:1, and the mixing is achieved by stirring, ultrasonic sound, or ball grinding.

In a class of this embodiment, the doping agent is a metal doping agent or a nonmetal doping agent. The metal is tin, copper, argentum, aluminum, chrome, iron, titanium, manganese, nickel, or cobalt, or an oxide, nitride, boride, fluoride, bromide, sulfide, organic compound thereof, or a mixture thereof. The nonmetal is silicon, phosphorus, boron, nitrogen, carbon, or sulfur, or a compound thereof, or a mixture thereof.

In a class of this embodiment, the inert gas in step d) and e) is nitrogen or argon.

In a class of this embodiment, tin powder is added in the cyclized LPAN solution as the doping agent to yield a large-sized carbon microtube.

Advantages of the invention are summarized as follows:

The invention provides a method for preparing a carbon nanotube or a carbon microtube, by which carbon tube materials and various doping element modified carbon nanotube or carbon microtube materials are obtained. Not only does the carbon tube have particular appearances, high conductivity, and specific capacity, but also the cycle performance is highly improved. The method is superior in simple process and device, low production costs, high yield, high purification and excellent appearance of the carbon tube. As the LPAN contains a large number of functional groups and is a liquid precursor, by doping modification, the LPAN is evenly mixed and tightly combined with the doping agent to form a carbon nanotube comprising a center filled with nodular doping agent, and a bamboo-shaped carbon nanotube/microtube having a surface attached with doping agent particles.

BRIEF DESCRIPTION OF THE DRAWINGS

The invention is described hereinbelow with reference to the accompanying drawings, in which.

DETAILED DESCRIPTION OF THE EMBODIMENTS

Figure 1:
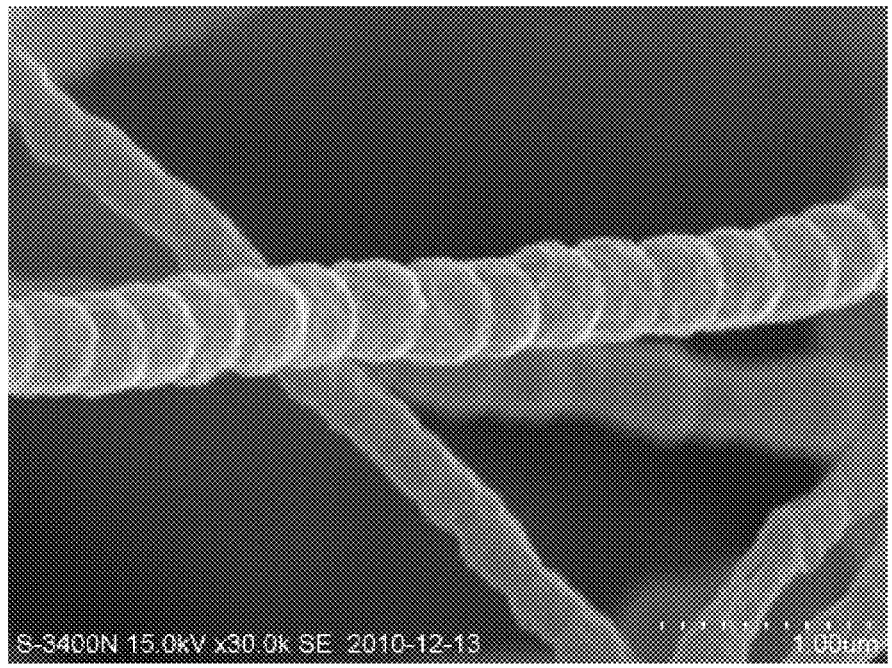
FIG. 1 is a scanning electron microscope (SEM) image of a hollow bamboo-shaped carbon nanotube in accordance with Example 1.

For further illustrating the invention, experiments detailing a method for preparing a carbon nanotube or a carbon microtube are described below. It should be noted that the following examples are intended to describe and not to limit the invention.

A method for preparing a carbon nanotube or a carbon microtube, comprises:
  a) preparing a liquid polyacrylonitrile (LPAN) solution, stirring the LPAN solution at between 100 and 200° C. for between 100 and 200 h to yield a cyclized LPAN solution;
  b) heating the cyclized LPAN solution at between 200 and 300° C. for between 1 and 10 h to yield a thermally-oxidized polyacrylonitrile (OPAN) solution comprising a ladder structure;
  c) grinding, screening, and drying at room temperature the OPAN to yield a thermal oxidative precursor;
  d) calcining the thermal oxidative precursor at between 400 and 1000° C. for between 1 and 24 h in the presence of inert gas having a flow rate of between 10 and 500 mL/min to yield a carbonated precursor; and
  e) calcining the carbonated precursor at between 1000 and 1500° C. for between 1 and 10 h in the presence of the inert gas having a flow rate of between 10 and 500 mL/min to yield a carbon nanotube material; or calcining the carbonated precursor at between 1500 and 1800° C. for between 10 and 24 h in the presence of the inert gas having a flow rate of between 10 and 500 mL/min to yield a carbon microtube material.

The method further comprises adding a doping agent to the cyclized LPAN solution and mixing for modifying the cyclized LPAN solution.

The method of the invention adjusts the carbonization conditions and modifies the cyclized LPAN solution by using the doping agent to obtain a carbon nanotube having a hollow filled with nodular doping agent, or a carbon nanotube/microtube having a surface attached with particles of the doping agent. In preparation of the carbon microtube, a large-sized carbon microtube is yielded when using tin powder as the doping agent. The purpose of the calcinations in the method is that the product after the twice calcinations has a more stable carbon structure and is highly graphitized, so that the carbon tube is easily formed.

The LPAN has a relative molecular weight of between 106 and 100,000, preferably between 1,600 and 25,000. The LPAN is a homopolymer of acrylonitrile, or a copolymer of acrylonitrile and a vinyl monomer, the vinyl monomer being styrene, methyl methacrylate, hydroxyethyl methacrylate, acrylic acid, or itaconic acid. The LPAN rather than diluted LPAN solution is employed in the method, this is because the LPAN is a long-chain molecule having a high carbon content and a large molecular weight and thus is capable of providing a structure basis for preparing a highly graphitized carbon tube.

In step b), the cyclized LPAN solution at between 200 and 300° C. is heated for between 1 and 10 h to yield the OPAN comprising the ladder structure. The OPAN of such a structure has a high carbon content and stable structure, and the formed cyclized structure provides a structure basis for the formation of a highly graphitized carbon tube.

In the process of doping modification of the carbon tube, a mass ratio of the added doping agent to the cyclized LPAN solution is 0.01-0.5:1. The mixing is achieved by stirring, ultrasonic sound, or ball grinding. The cyclized LPAN comprises a large number of functional groups that is capable of tightly combining with the doping agent or the carbon material. Part of the functional groups of the LPAN and the doping agent are coordinated with each other, so that the mixture is compatible at the molecular level. After the grinding or the stirring, LPAN is fully mixed with the doping agent to form the carbon nanotube having a center filled with the nodular doping agent, or the carbon nanotube or the carbon microtube having a surface attached with particles of the doping agent.

The doping agent is a metal doping agent or a nonmetal doping agent. The metal is tin, copper, argentum, aluminum, chrome, iron, titanium, manganese, nickel, or cobalt, or an oxide, nitride, boride, fluoride, bromide, sulfide, and organic compound thereof, or a mixture thereof. The nonmetal is silicon, phosphorus, boron, nitrogen, carbon, or sulfur, or a compound thereof, or a mixture thereof.

A sieve having between 200 and 400 meshes is employed to screen the ground OPAN solid.

The inert gas for calcination in step d) and e) is nitrogen or argon.

EXAMPLE 1

20 g of a liquid polyacrylonitrile (LPAN) solution (having a molecular weight of 4000) was prepared and stirred for 120 h at a temperature of 120° C. to form a cyclized LPAN solution. The cyclized LPAN solution was then heated for 8 h at a temperature of between 200 and 300° C. to form an OPAN solid comprising a ladder structure. After that, the OPAN solid was ground by a planetary ball grinder. A ratio between a grinding media and the OPAN solid was controlled at 15:1, a grinding speed was controlled at 400 rad/min, and a grinding time was controlled at 8 h. Thereafter, the ground OPAN solid was discharged from the planetary ball grinder, screened, and dried at room temperature to obtain a thermal oxidative precursor.

Figure 2:
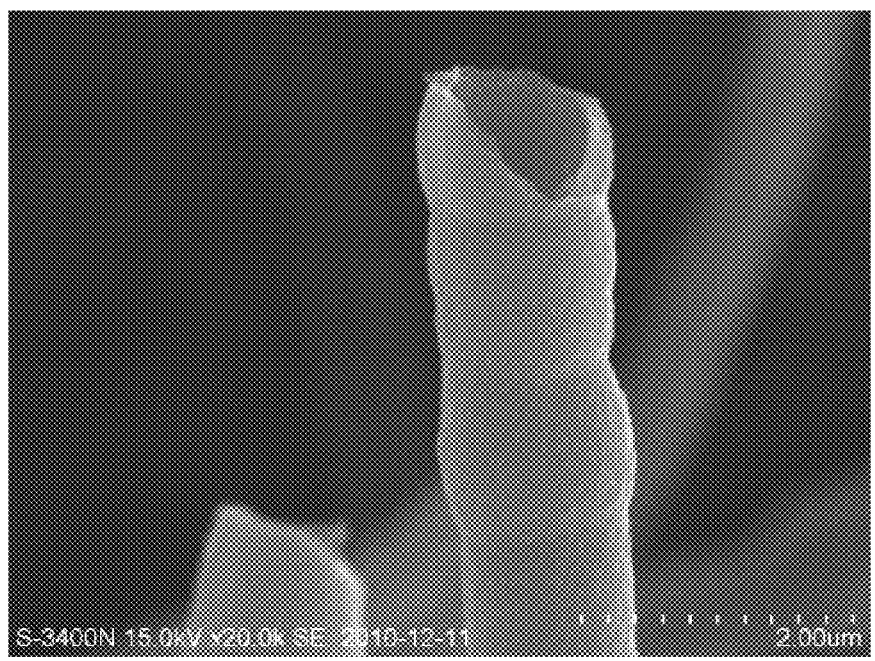
FIG. 2 is a SEM image of a cross section of a hollow bamboo-shaped carbon nanotube in accordance with Example 1.
Figure 3:
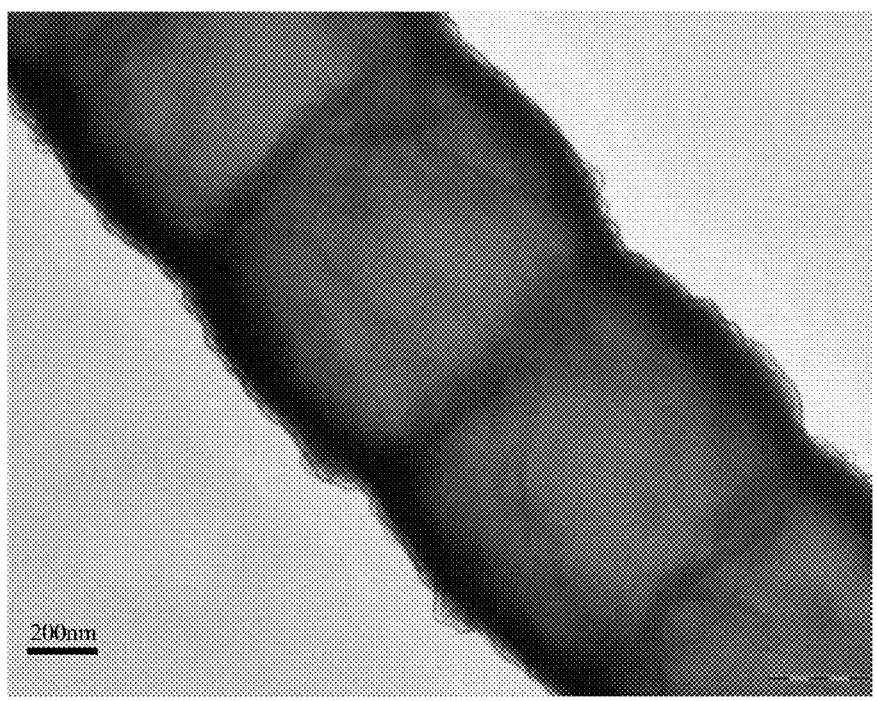
FIG. 3 is a transmission electron microscope (TEM) image of a hollow bamboo-shaped carbon nanotube, a wall of which is a graphitized carbon layer, in accordance with Example 1.
Figure 4:
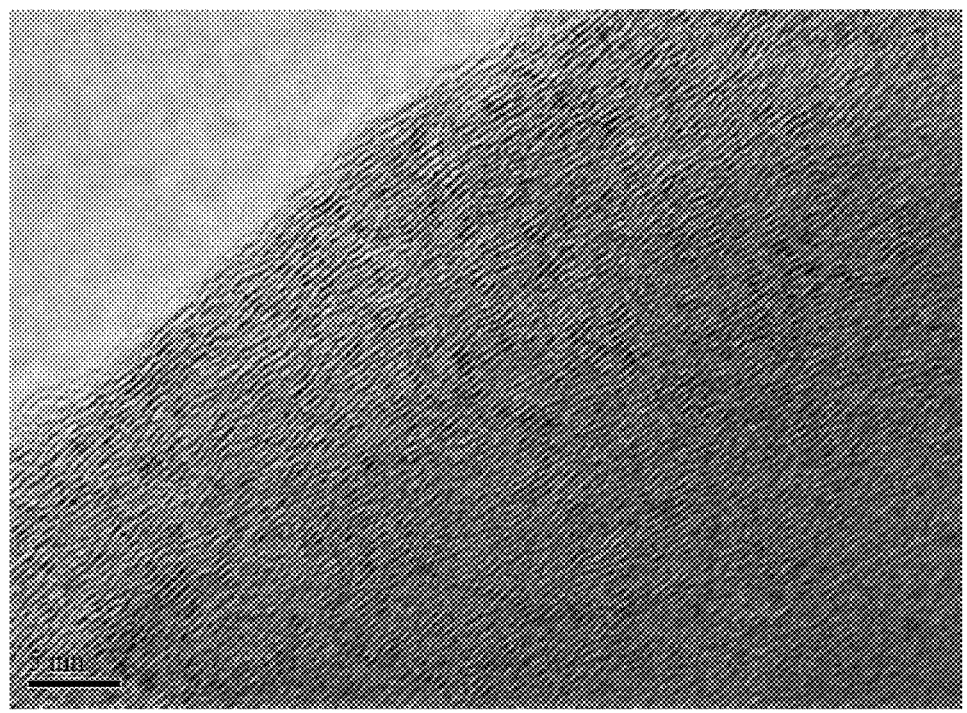
FIG. 4 is another TEM image of a hollow bamboo-shaped carbon nanotube carbon nanotube, a wall of which is a graphitized carbon layer, in accordance with Example 1.

The thermal oxidative precursor was then transferred to a combustion boat and was calcined at a temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at a temperature of 1300° C. for 8 h in the presence of the inert gas having the flow rate of 100 mL/min for high temperature carbonization, and a hollow bamboo-shaped carbon nanotube was obtained, structure of which was shown in FIGS. 1-2. A wall of the carbon nanotube was a graphitized carbon layer, as shown in FIGS. 3-4.

EXAMPLE 2

20 g of an LPAN solution (having a molecular weight of 4000) was prepared and stirred for 120 h at a temperature of 120° C. to form a cyclized LPAN solution. 0.6 g of $SnO_2$ powder was added to the cyclized LPAN solution as a doping agent (a weight ratio between the doping agent and the LPAN was 0.03:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a $SnO_2$-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

Figure 5:
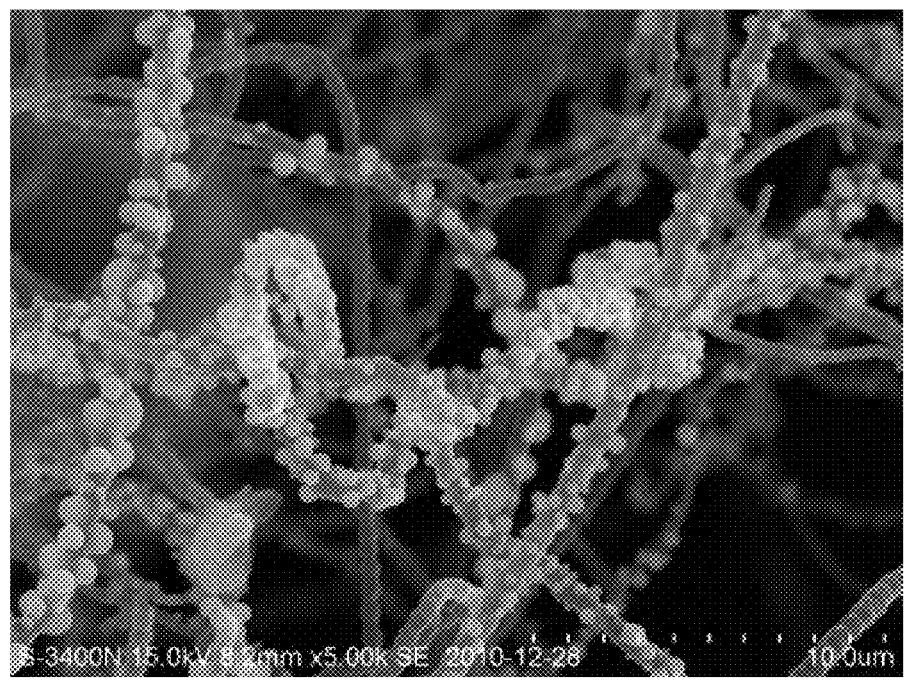
FIG. 5 is a SEM image of a hollow bamboo-shaped carbon nanotube having a surface doped with $SnO_2$ particles in accordance with Example 2.
Figure 6:
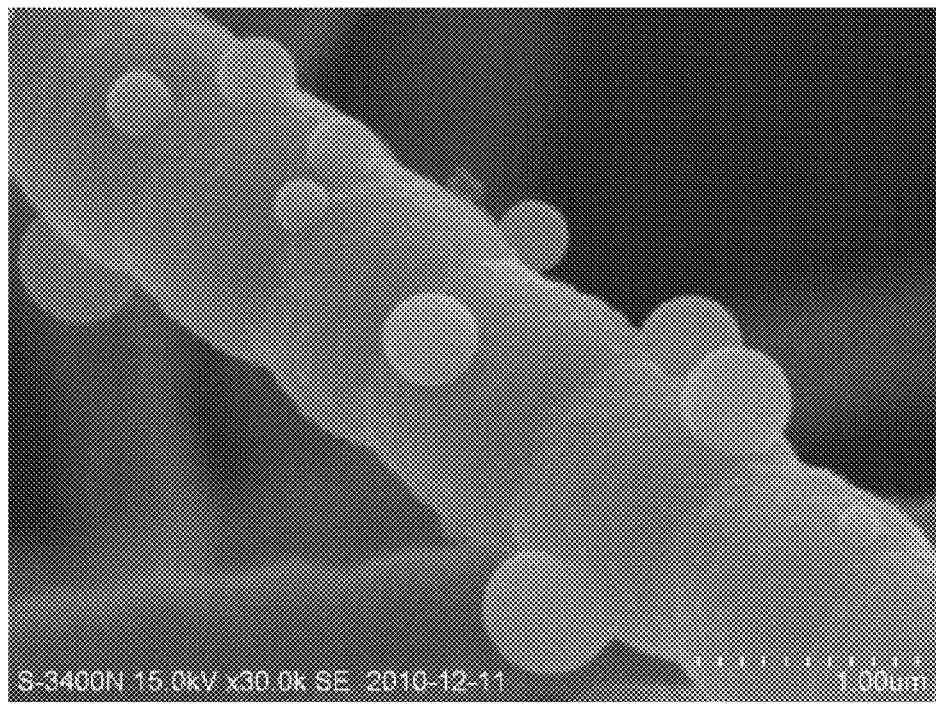
FIG. 6 is another SEM image of a hollow bamboo-shaped carbon nanotube having a surface doped with $SnO_2$ particles in accordance with Example 2.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1300° C. for 8 h in the presence of the inert gas having the flow rate of 100 mL/min for high temperature carbonization, and a hollow bamboo-shaped carbon nanotube having a surface doped with $SnO_2$ particles was obtained, structure of which was shown in FIGS. 5-6. Stannic oxide particles were tightly attached to the surface of the hollow bamboo-shaped carbon nanotube.

EXAMPLE 3

20 g of an LPAN solution (having a molecular weight of 4000) was prepared and stirred for 120 h at a temperature of 120° C. to form a cyclized LPAN solution. 0.6 g of $TiO_2$ powder was added to the cyclized LPAN solution as a doping agent (a weight ratio between the doping agent and the LPAN was 0.03:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a $TiO_2$-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

Figure 7:
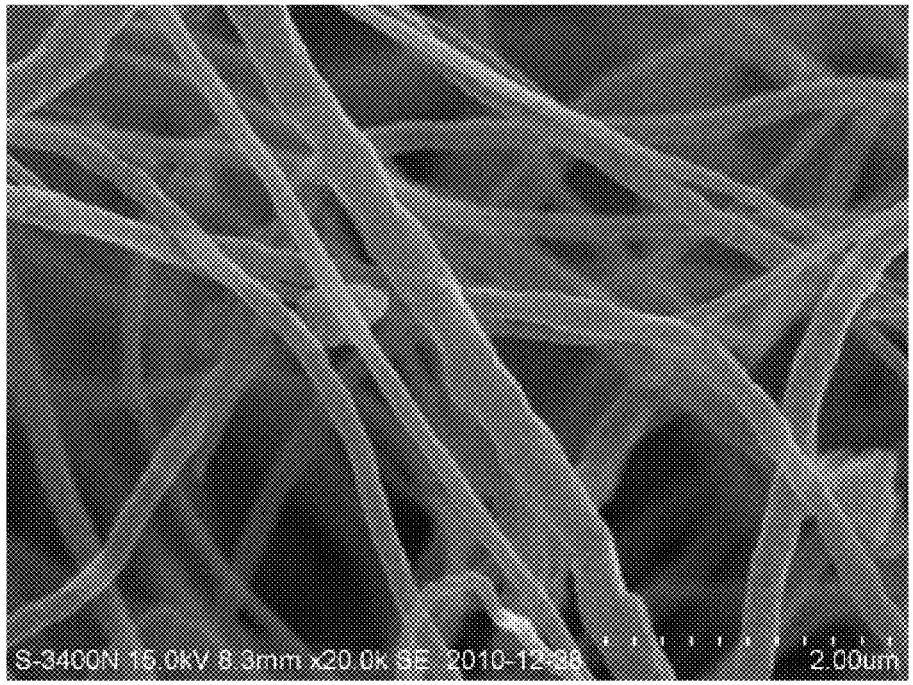
FIG. 7 is a SEM image of a carbon nanotube having a common shape in accordance with Example 3.
Figure 8:
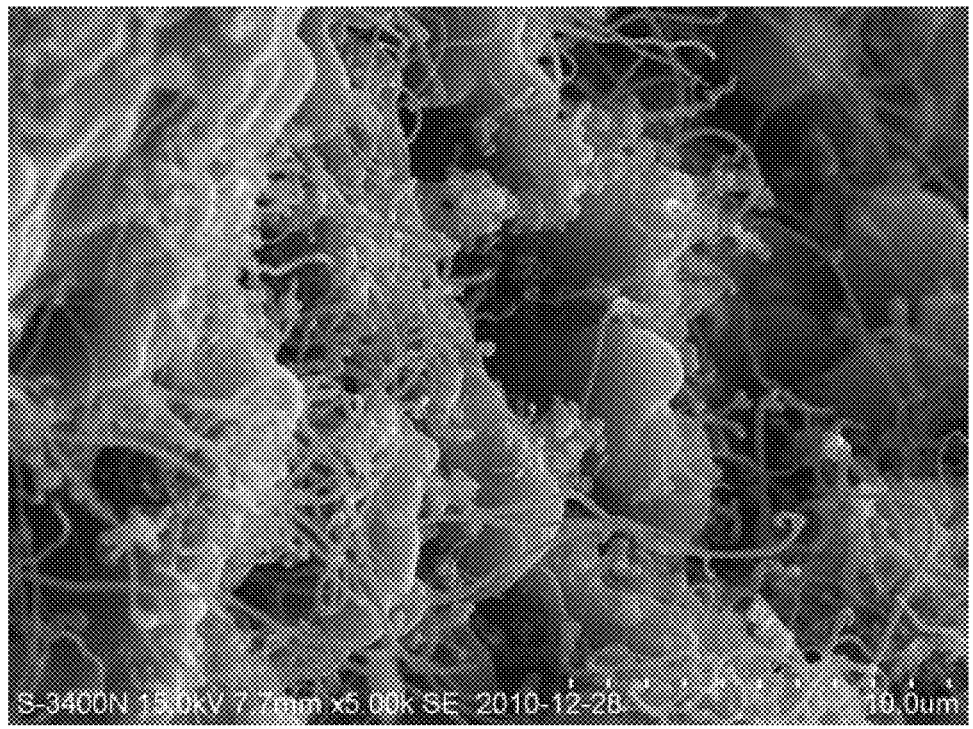
FIG. 8 is a SEM image of a carbon nanotube having a common shape in accordance with Example 4.
Figure 9:
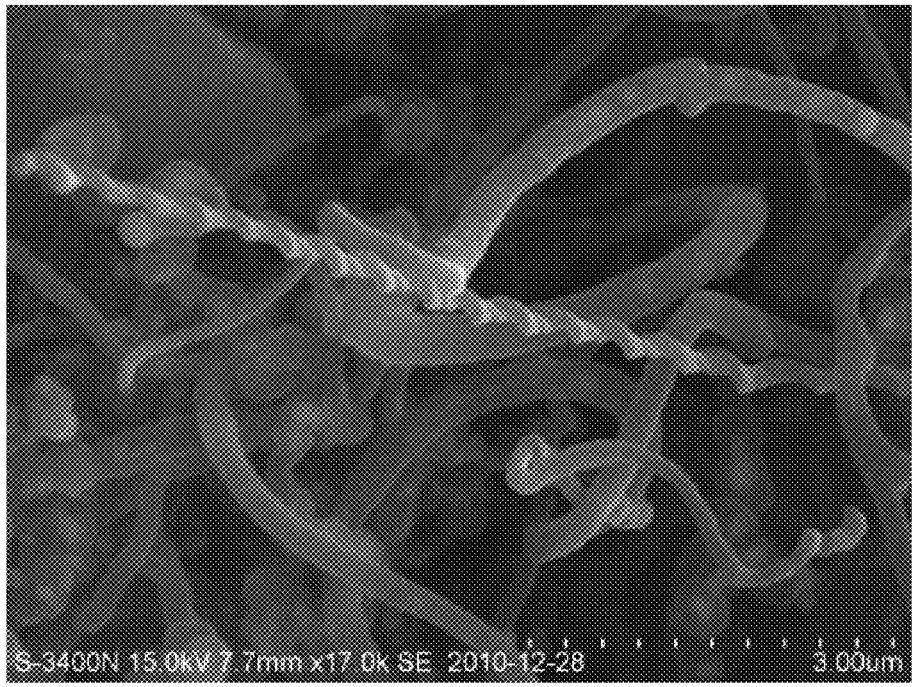
FIG. 9 is another SEM image of a carbon nanotube having a common shape in accordance with Example 4.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1300° C. for 8 h in the presence of the inert gas having the flow rate of 100 mL/min for high temperature carbonization, and a carbon nanotube was obtained, structure of which was shown in FIG. 7. The product was a carbon nanotube having a common shape.

EXAMPLE 4

20 g of an LPAN solution (having a molecular weight of 4000) was prepared and stirred for 120 h at a temperature of 120° C. to form a cyclized LPAN solution. 0.6 g of $Fe_2O_3$ powder was added to the cyclized LPAN solution as a doping agent (a weight ratio between the doping agent and the LPAN was 0.03:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a $Fe_2O_3$-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

Figure 10:
FIG. 10 is a TEM image of a carbon nanotube comprising a center filled with nodular doping agent in accordance with Example 4.
Figure 11:
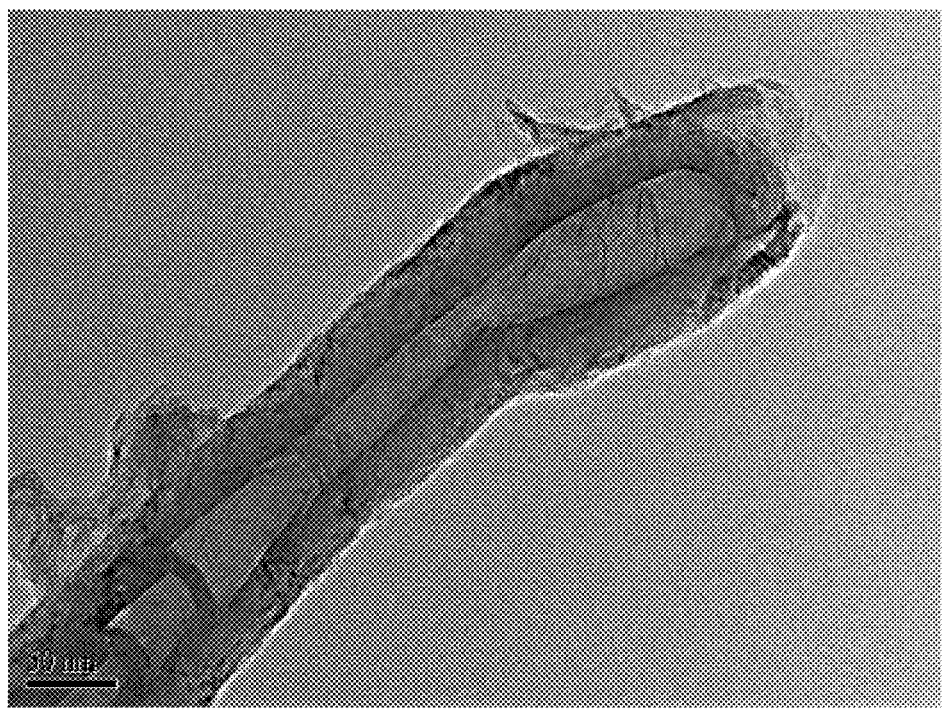
FIG. 11 is another TEM image of a carbon nanotube comprising a center filled with nodular doping agent in accordance with Example 4.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1300° C. for 8 h in the presence of the inert gas having the flow rate of 100 mL/min for high temperature carbonization, and a carbon nanotube comprising a center filled with nodular $Fe_2O_3$ was obtained. The product was a carbon nanotube having a common shape. As shown in FIGS. 10-11, the product was a carbon nanotube comprising the center filled with nodular $Fe_2O_3$.

EXAMPLE 5

20 g of an LPAN solution (having a molecular weight of 4000) was prepared and stirred for 120 h at a temperature of 120° C. to form a cyclized LPAN solution. 1.0 g of $Fe_2O_3$ powder was added to the cyclized LPAN solution as a doping agent (a weight ratio between the doping agent and the LPAN was 0.05:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a $Fe_2O_3$-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1300° C. for 8 h in the presence of the inert gas having the flow rate of 100 mL/min for high temperature carbonization, and a carbon nanotube comprising a center filled with a nodular doping agent was obtained.

EXAMPLE 6

20 g of an LPAN solution (having a molecular weight of 4000) was prepared and stirred for 120 h at a temperature of 120° C. to form a cyclized LPAN solution. 1.4 g of $Fe_2O_3$ powder was added to the cyclized LPAN solution as a doping agent (a weight ratio between the doping agent and the LPAN was 0.07:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a $Fe_2O_3$-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1300° C. for 8 h in the presence of the inert gas having the flow rate of 100 mL/min for high temperature carbonization, and a carbon nanotube comprising a center filled with a nodular doping agent was obtained.

EXAMPLE 7

20 g of an LPAN solution (having a molecular weight of 4000) was prepared and stirred for 120 h at a temperature of 120° C. to form a cyclized LPAN solution. 0.6 g of Fe powder was added to the cyclized LPAN solution as a doping agent (a weight ratio between the doping agent and the LPAN was 0.03:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a Fe-doped OPAN solid comprising a ladder structure. After that, the OPAN solid sample ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1300° C. for 8 h in the presence of the inert gas having the flow rate of 100 mL/min for high temperature carbonization, and a carbon nanotube was obtained.

EXAMPLE 8

20 g of an LPAN solution (having a molecular weight of 8000) was prepared and stirred for 120 h at a temperature of 120° C. to form a cyclized LPAN solution. 0.6 g of MnO$_2$ powder was added to the cyclized LPAN solution as a doping agent (a weight ratio between the doping agent and the LPAN was 0.03:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a MnO$_2$-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

Figure 12:
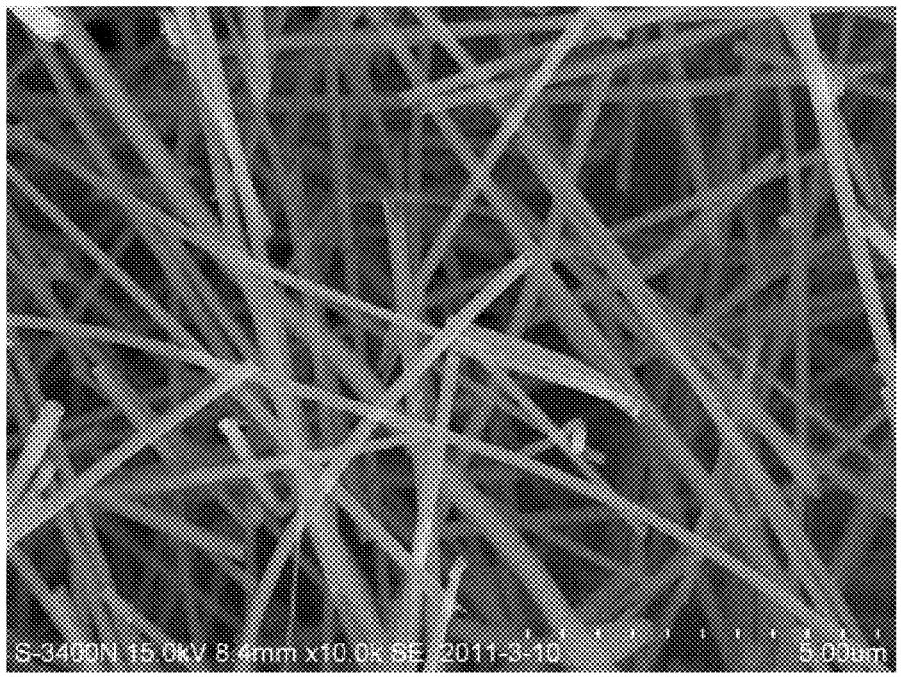
FIG. 12 is a SEM image of a smooth straight carbon nanotube in accordance with Example 8.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1300° C. for 8 h in the presence of the inert gas having the flow rate of 100 mL/min for high temperature carbonization, and a smooth straight carbon nanotube was obtained. A structure of the product was shown in FIG. 12, which illustrates the smooth straight carbon nanotube.

EXAMPLE 9

20 g of an LPAN solution (having a molecular weight of 4000) was prepared and stirred for 120 h at a temperature of 120° C. to form a cyclized LPAN solution. 0.6 g of Sn powder was added to the cyclized LPAN solution as a doping agent (a weight ratio between the doping agent and the LPAN was 0.03:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a Sn-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

Figure 13:
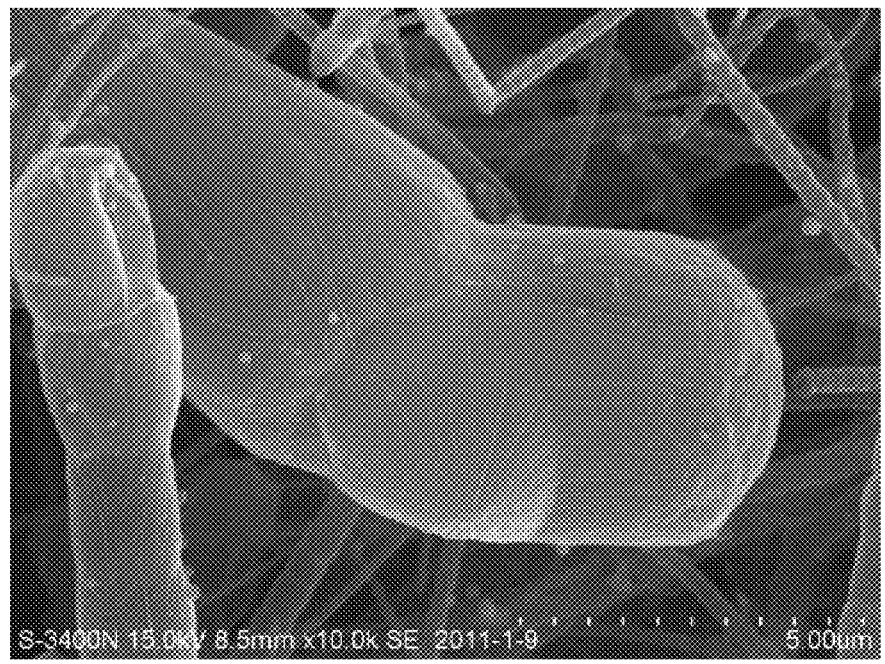
FIG. 13 is a SEM image of a large-sized hollow carbon microtube in accordance with Example 9.
Figure 14:
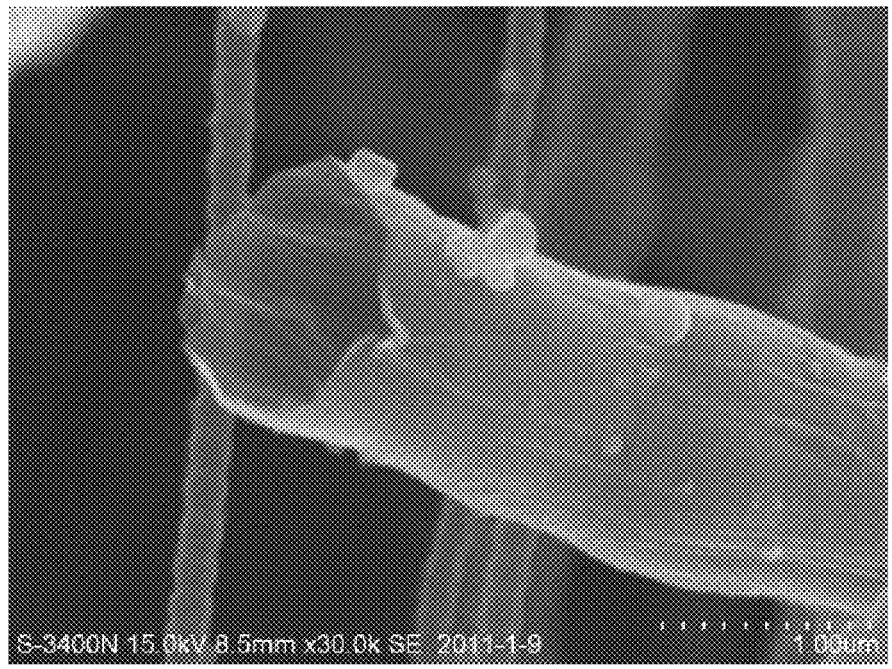
FIG. 14 is a SEM image of a cross section of a large-sized hollow carbon microtube in accordance with Example 9.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1,500° C. for 10 h in the presence of the inert gas having the flow rate of 100 mL/min for high temperature carbonization, and a large-sized carbon microtube was obtained. A structure of the product was shown in FIGS. 13-14, the product was a large-sized hollow carbon nanotube.

EXAMPLE 10

20 g of an LPAN solution (having a molecular weight of 10,000) was prepared and stirred for 120 h at a temperature of 120° C. to form a cyclized LPAN solution. 0.6 g of NiO powder was added to the cyclized LPAN solution as a doping agent (a weight ratio between the doping agent and the LPAN was 0.03:1) to form a mixture. Thereafter, the mixture water ground by a planetary ball grinder. A ratio between a grinding media and the mixture was controlled at 15:1, a grinding speed was controlled at 500 rpm, and a grinding time was controlled at 8 h. A resulting product was discharged out of the planetary ball grinder and then heated at a temperature between 200 and 300° C. for 8 h to form a NiO-doped OPAN solid comprising a ladder structure. After that, the OPAN solid sample was ground by the planetary ball grinder. The ratio between the grinding media and the OPAN solid sample was controlled at 15:1, the grinding speed was controlled at 400 rad/min, and the grinding time was controlled at 8 h. Thereafter, the ground OPAN solid sample was discharged from the planetary ball grinder, screened, and dried at room temperature to obtain a thermal oxidative precursor.

The thermal oxidative precursor was then transferred to a combustion boat and was calcined at the temperature of 900° C. for 8 h in the presence of inert gas having a flow rate of 100 mL/min. A resulting product was cooled to room temperature, ground, and screened to obtain a low temperature carbonated precursor. After that, the carbonated precursor was transferred to the combustion boat again and calcined at the temperature of 1,300° C. for 8 h in the presence of the inert gas having the flow rate of 100 mL/min for high temperature carbonization, and a carbon nanotube was obtained.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a carbon nanotube, the method comprising:
   a) preparing a liquid polyacrylonitrile (LPAN) solution, stirring the LPAN solution at between 100 and 200° C. for between 100 and 200 h to yield a cyclized LPAN solution;
   b) heating the cyclized LPAN solution at between 200 and 300° C. for between 1 and 10 h to yield a thermally-oxidized polyacrylonitrile (OPAN) comprising a ladder structure;
   c) grinding, screening, and drying at room temperature the OPAN to yield a thermal oxidative precursor;
   d) calcining the thermal oxidative precursor at between 400 and 1000° C. for between 1 and 24 h in the presence of inert gas having a flow rate of between 10 and 500 mL/min to yield a carbonated precursor; and
   e) calcining the carbonated precursor at between 1000 and 1500° C. for between 1 and 10 h in the presence of the inert gas having a flow rate of between 10 and 500 mL/min to yield a carbon nanotube material.

2. The method of claim 1, further comprising adding a doping agent to the cyclized LPAN solution and mixing for modifying the cyclized LPAN solution.

3. The method of claim 1, wherein
   the LPAN has a relative molecular weight of between 106 and 100,000; and
   the LPAN is a homopolymer of acrylonitrile, or a copolymer of acrylonitrile and a vinyl monomer, the vinyl monomer being styrene, methyl methacrylate, hydroxyethyl methacrylate, acrylic acid, or itaconic acid.

4. The method of claim 1, wherein the LPAN has a relative molecular weight of between 1,600 and 25,000.

5. The method of claim 1, wherein a mass ratio of the added doping agent to the cyclized LPAN solution is 0.01-0.5:1; and the mixing is achieved by stirring, ultrasonic sound, or ball grinding.

6. The method of claim 1, wherein
the doping agent is a metal doping agent or a nonmetal doping agent;
the metal is tin, copper, argentum, aluminum, chrome, iron, titanium, manganese, nickel, cobalt, or an oxide, nitride, boride, fluoride, bromide, sulfide, and organic compound thereof, or a mixture thereof; and
the nonmetal is silicon, phosphorus, boron, nitrogen, carbon, sulfur, or a compound thereof, or a mixture thereof.

7. The method of claim 1, wherein the inert gas in step d) and e) is nitrogen or argon.

8. A method for preparing a carbon microtube, the method comprising:
 a) preparing a liquid polyacrylonitrile (LPAN) solution, stirring the LPAN solution at between 100 and 200° C. for between 100 and 200 h to yield a cyclized LPAN solution;
 b) heating the cyclized LPAN solution at between 200 and 300° C. for between 1 and 10 h to yield a thermally-oxidized polyacrylonitrile (OPAN) comprising a ladder structure;
 c) grinding, screening, and drying at room temperature the OPAN to yield a thermal oxidative precursor;
 d) calcining the thermal oxidative precursor at between 400 and 1000° C. for between 1 and 24 h in the presence of inert gas having a flow rate of between 10 and 500 mL/min to yield a carbonated precursor; and
 e) calcining the carbonated precursor at between 1500 and 1800° C. for between 10 and 24 h in the presence of the inert gas having a flow rate of between 10 and 500 mL/min to yield a carbon microtube material.

9. The method of claim 8, further comprising adding a doping agent to the cyclized LPAN solution and mixing for modifying the cyclized LPAN solution.

10. The method of claim 8, wherein
the LPAN has a relative molecular weight of between 106 and 100,000; and
the LPAN is a homopolymer of acrylonitrile, or a copolymer of acrylonitrile and a vinyl monomer, the vinyl monomer being styrene, methyl methacrylate, hydroxyethyl methacrylate, acrylic acid, or itaconic acid.

11. The method of claim 8, wherein the LPAN has a relative molecular weight of between 1,600 and 25,000.

12. The method of claim 8, wherein a mass ratio of the added doping agent to the cyclized LPAN solution is 0.01-0.5:1; and the mixing is achieved by stirring, ultrasonic sound, or ball grinding.

13. The method of claim 8, wherein
the doping agent is a metal doping agent or a nonmetal doping agent;
the metal is tin, copper, argentum, aluminum, chrome, iron, titanium, manganese, nickel, cobalt, or an oxide, nitride, boride, fluoride, bromide, sulfide, organic compound thereof, or a mixture thereof; and
the nonmetal is silicon, phosphorus, boron, nitrogen, carbon, sulfur, or a compound thereof, or a mixture thereof.

14. The method of claim 8, wherein the inert gas in step d) and e) is nitrogen or argon.

15. The method of claim 13, wherein the doping agent is tin powder.

* * * * *